United States Patent

Koike et al.

[11] 4,113,359
[45] Sep. 12, 1978

[54] AUTOMATIC DIAPHRAGM ASSEMBLY

[76] Inventors: Hiroshi Koike, No.5-10,1-Chome, Minami-Azabu, Minato-ku, Tokyo; Shoji Suzuki, No.17-7-104,3-Chome, Satagaya, Setagaya-ku, Tokyo; Takeki Asakawa, No. 556, 4-Chome, Taisei-cho, Ohmiya City, Saitama Prefecture, all of Japan

[21] Appl. No.: 778,240
[22] Filed: Mar. 16, 1977
[51] Int. Cl.² ............................................. G05D 25/00
[52] U.S. Cl. ........................................ 350/269; 250/229; 350/315; 354/271; 354/274
[58] Field of Search ............................. 350/266, 269, 315; 354/271, 274; 358/228; 250/229

[56] References Cited

U.S. PATENT DOCUMENTS

| | | | |
|---|---|---|---|
| 2,655,848 | 10/1953 | Gray, Jr. | 250/229 X |
| 3,700,314 | 10/1972 | Busby, Jr. | 350/315 X |
| 3,836,234 | 9/1974 | Farnsworth | 350/266 |
| 4,060,313 | 11/1977 | Kondo | 350/269 |

FOREIGN PATENT DOCUMENTS 2,623,461  2/1976  Fed. Rep. of Germany ........... 354/274

Primary Examiner—John K. Corbin
Assistant Examiner—Matthew W. Koren
Attorney, Agent, or Firm—Haseltine, Lake, & Waters

[57] ABSTRACT

An automatic diaphragm assembly for use in an optical or optoelectronic image pick-up device having lens systems, comprising diaphragm blades forming a variable aperture, at least one neutral-density filter element movable with one of the diaphragm blades, and an electromagnetic drive unit including a ring-shaped permanent magnet having locally magnetized pole portions alternately disposed circumferentially of the magnet and a ferromagnetic ring forming a circular air gap between the permanent magnet and the ferromagnetic ring.

15 Claims, 12 Drawing Figures

AUTOMATIC DIAPHRAGM ASSEMBLY

The present invention relates to an automatic diaphragm assembly for use with the lens systems of an optical or optoelectronic image pick-up device such as a still, motion-picture or television camera.

Ordinary still cameras use diaphragms and shutters to regulate the amounts of light to enter the cameras through the lens systems thereof. In motion-picture cameras having shutters with fixed openings or in television cameras which are void of shutters, however, the amounts of light to be admitted into the cameras are controlled only by diaphragms. When the amount of light to be admitted into a camera is thus controlled by means of a diaphragm alone, the reduction ratio of the light entering the camera is limited to less than 1:4000 when the lens aperture is reduced from $f/1.0$ to $f/64$. In the case of television cameras using vidicons which are presently in wide use, however, it is required that the amounts of light to be admitted into the cameras by reduced to the order of fractions of tens of thousands.

With a view to enabling a television camera to be sensitive to a broader range of brightness, a modernized version of television camera has incorporated therein a neutral-density filter which is adapted to uniformly reduce the spectro-transmissivity of light throughout the entire range of interest. Such a filter is positioned in front of the lens systems of the camera and is arranged to be movable through the path of the light to be indicent on the lens systems. The neutral-density filter is operated by drive means which is usually constituted by a servo motor adapted to initiate the filter into motion to intercept the path of light when the intensity of the light passed through the lens systems is greater than a predetermined value. The drive means for the neutral-density filter being provided in addition to the drive means for the diaphragm unit, provision of the filter and the drive means therefor makes the whole construction of the camera disproportionately large-sized and unwieldy.

The drive means for the diaphragm unit of a conventional television camera is also usually constituted by a servo motor which, in this instance, is adapted to continuously move the diaphragm blades in response to variation in the intensity of the light passed through the lens systems of the camera. If, therefore, the intensity of the light issuing from the object being televised fluctuates frequently, the diaphragm unit must be moved frequently and rapidly so as to accurately follow the variation in the intensity of the incident light. The servo motor is, however, connected to the diaphragm unit by various torque transmission elements including reduction gears, the motions of the servo motor can not be transmitted to the diaphragm unit smoothly and precisely so that the diaphragm unit is unable to faithfully follow the variation in the intensity of light. Provision of the reduction gears and other torque transmission elements thus mounted between the diaphragm unit and the associated servo motor further adds to the overall dimensions and weight of the camera. Another problem resulting from the use of a servo motor as the drive means for the diaphragm unit is that the servo motor is arranged to have its axis of rotation not aligned with the optical axis of the lens systems and for this reason difficulties are encountered in enabling the servo motor to drive the diaphragm unit smoothly and accurately.

The present invention contemplates elimination of all these problems that have been inherent in prior-art television cameras equipped with automatically operated diaphragm units and neutral-density filters. It is, accordingly, a prime object of the present invention to provide an automatic diaphragm assembly featuring a neutral-density filter which is reasonably positioned within the diaphragm assembly and single drive means which is capable of concurrently operating both of the diaphragm unit and the neutral-density filter. While the foregoing discussion regarding the prior art has been principally directed at television cameras, it will be understood as the description proceeds that a diaphragm assembly herein proposed is applicable not only to television cameras but to any other types of optical or optoelectronic image pick-up devices such as still cameras, motion-picture cameras and other special purpose cameras.

In accordance with the present invention, there is provided an automatic diaphragm assembly for use in an optical or optoelectronic image pick-up device having lens systems, comprising a stationary support structure supporting the lens systems and including a flange formed with a substantially circular opening having a center axis therethrough, a plurality of diaphragm blades rotatable about respective axes disposed substantially symmetrically about said center axis, the diaphragm blades forming therebetween a variable aperture having maximum and minimum areas and a center axis substantially in line with the center axis of the opening, at least one neutral-density filter element rotatable about one of the respective axes of rotation of the diaphragm blades between an angular position located in its entirety out of said variable aperture when the diaphragm blades are in positions having the variable aperture enlarged to the maximum area and an angular position fully intercepting the variable aperture when the diaphragm blades are in positions having the variable aperture reduced to the minimum areas, a ring-shaped permanent magnet having a center axis substantially in line with the center axis of the opening and having pole portions which have opposite polarities alternately disposed circumferentially of the magnet and in driving engagement with the diaphragm blades and the neutral-density filter element, a ferromagnetic ring positioned in substantially coaxial relationship to the permanent magnet and having a plurality of limb portions respectively terminating in end portions which are substantially regularly spaced apart from each other circumferentially of the ring and which have end faces located close to the permanent magnet, said limb portions consisting of a plurality of groups each consisting of three limb portions, one of the permanent magnet and the ferromagnetic ring being fixedly held in position with respect to the support structure and the other thereof being rotatable about the center axis of the permanent magnet, and two coils carried on each of the groups, one of the two coils being wound on one pair of neighboring limb portions in each of the groups and the other of the two coils being wound on the other pair of neighboring limb portions in each of the groups, the coils on each of the groups being wound in the opposite directions to the coils on the neighboring groups.

The features and advantages of an automatic diaphragm assembly according to the present invention will become more apparent from the following description taken in conjunction with the accompanying drawings, in which.

Figure 1:
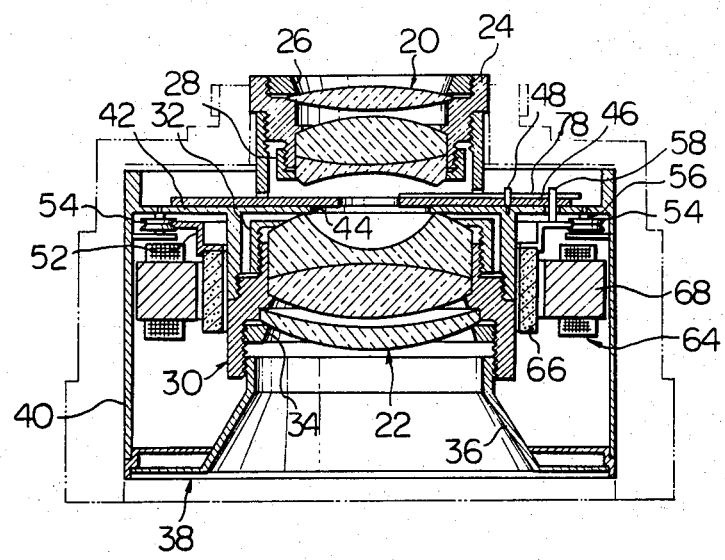
FIG. 1 is a longitudinal sectional view showing a photographic camera incorporating a preferred embodiment of the present invention.
Figure 2:
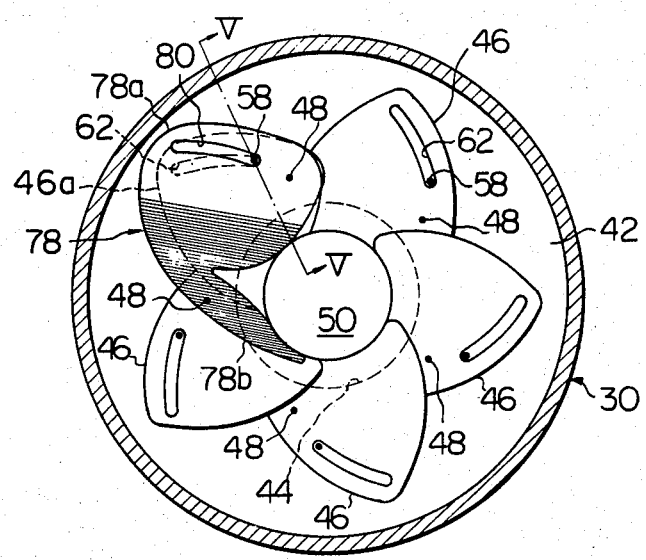
FIGS. 2 to 4 are plan views showing different operational conditions of the diaphragm diaphragm unit forming part of the embodiment of FIG. 1.

Referring to FIG. 1 of the drawings, an automatic diaphragm assembly embodying the present invention is shown incorporated into a camera including first and second lens systems 20 and 22 having respective principal axes which are substantially in line with each other. The first lens system 20 is fixedly held in position within a generally cylindrical support member 24 by means of retaining rings 26 which are screwed to the support member 24. Likewise, the second lens system 22 is fixedly held in position within a generally cylindrical support structure 30 by means of retaining rings 32 and 34 which are screwed to the support structure 30. The support structure 30 is screwed to the support member 24 and is fixedly mounted on an internal base wall portion 36 of a housing structure 38 having a generally cylindrical outer side wall portion 40 which is substantially concentrically surrounding relationship to the support structure 30 for the second lens system 24 and which thus forms an annular space between the support structure 30 and the side wall portion 40 of the housing structure 38 as shown.

The support structure 30 has an annular flange 42 on a plane which is substantially perpendicular to the principal axes of the lens systems 20 and 22 and which intervenes between the lens systems 20 and 22. The annular flange 42 is formed with a circular opening 44 having a center axis substantially in line with the aligned principal axes of the lens systems 20 and 22 and which is located between the lens systems.

As will be seen more clearly in FIGS. 2 to 5, the annular flange 42 of the support structure 30 has mounted on one face thereof a suitable number of diaphragm blades 46 which are shown as being five in number by way of example. The diaphragm blades 46 are arranged to partially intervene one another and are respectively rotatable about pivotal pins 48 which are pegged to the flange 42 and which are disposed substantially symmetrically about the center axis of the opening 44 in the flange 42. The diaphragm blades 46 are thus adapted to form about the center axis of the opening 42 a variable aperture 50 open to the opening 42 when the blades 46 are driven to turn in unison about the pivotal pins 48 as will be seen from FIGS. 2 to 4. The support structure 30 has formed in a cylindrical wall portion thereof slots which are elongated in circumferential direction of the support structure for allowing the respective diaphragm blades 46 to movably extend inwardly of the cylindrical wall portion.

Figure 5:
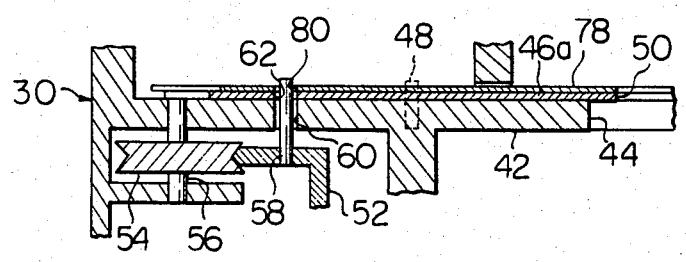
FIG. 5 is a cross sectional view taken along line V—V of FIG. 2.

The drive means for the diaphragm blades 46 thus arranged comprises a control ring 52 concentrically encircling a cylindrical wall portion of the support structure 30 and a plurality of circumferentially grooved wheels 54 which are respectively rotatable on shafts 56 projecting from the other face of the flange 42 of the support structure 30 in directions substantially parallel with the center axis of the opening 44, as seen in FIG. 5. The shafts 56 supporting the wheels 54 are disposed on a circle having a center coincident with the center axis of the opening 44 in the flange 42 and the control ring 52 has an outer peripheral edge rollably received in the respective circumferential grooves of the wheels 54. The control ring 52 is thus not only held in position relative to the support structure 30 but is rotatable about the center axis of the opening 44 in the flange 42 of the support structure 30. The shafts 56 are located farther from the center axis of the opening 44 in the flange 42 than the pivotal pins 48 on the flange 42 in radial directions of the flange 42.

The control ring 52 has mounted thereon driving pins 58 which correspond in number to the diaphragm blades 46 and which are movably passed through curved slots 60 formed in the flange 42. The driving pins 58 axially project outwardly substantially in parallel with the center axis of the opening 44 in the flange 42 from that face of the flange 42 on which the diaphragm blades 46 are supported. The driving pins 58 are further movably passed through curved slots 62 which are respectively formed in the individual diaphragm blades 46. The slots 60 in the flange 42 are provided in a number also corresponding to the number of the diaphragm blades 46 and are curved substantially concentrically to the circular opening 44 in the flange 42. On the other hand, the respective slots 62 in the diaphragm blades 46 are located farther from the center axis of the opening 44 than the pivotal pins 48 on the flange 42 and closer to the center axis of the opening 44 than the shafts 56 for the wheels 54 in radial directions of the flange 42. Furthermore, the curved slot 62 in each diaphragm blade 46 is configured in such a manner as to have one end located closest to the pivotal pin 48 for the particular diaphragm blade 46 and to the center axis of the opening 44 and to curvilinearly extend away from the associated pivotal pin 48 and the center axis of the opening 44 toward the other end, as will be seen from FIGS. 2 to 4. When, thus, the control ring 52 rotatably supported by the wheels 54 is driven to turn in either direction about the center axis of the opening 44, the driving pins 58 on the control ring 52 are moved around the center axis of the opening 44 through the curved slots 60 in the flange 42 and force the respectively associated diaphragm blades 46 to turn in either direction about the pivotal pins 48 on the flange 42 so that the variable aperture 50 formed by the individual diaphragm blades 46 is either enlarged or reduced, as in an ordinary diaphragm assembly.

Figure 6:
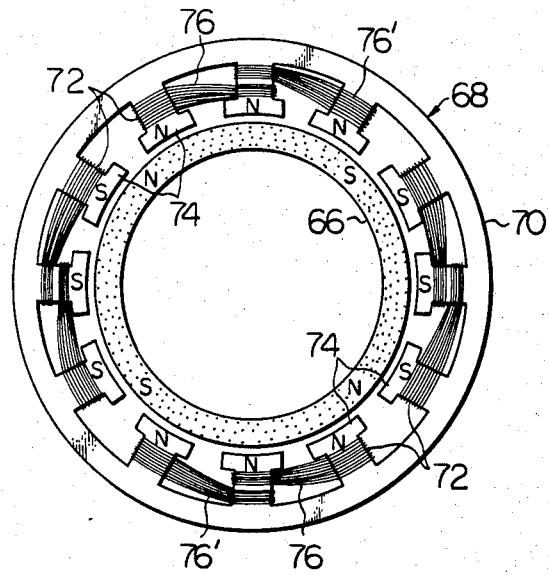
FIG. 6 is a plan view showing an electromagnetic drive unit forming part of the embodiment of FIG. 1.

The drive means for the diaphragm blades 46 further comprises an electromagnetic drive unit which is schematically shown at 64 in FIG. 1. As seen in FIG. 1, the electromagnetic drive unit 64 comprises a ring-shaped permanent magnet 66 which is positioned on the opposite side of the flange 42 of the support structure 30 to the diaphragm blades 46 and which substantially concentrically encircules a cylindrical wall portion of the support structure 30. The permanent magnet 66 is securely mounted on the above described control ring 52 and is thus rotatable with the control ring about the principal axis of the second lens system 22 through the annular space within the housing structure 38. The permanent magnet 66 thus has an axis of rotation which is substantially in line with the center axis of the opening 44 in the flange 42 of the support structure 30. As illustrated in FIG. 6, the permanent magnet 66 is polarized in such a manner as to have a first pair of diametrically opposed pole portions each having a north polarity as indicated at N and a second pair of diametrically opposed pole portions each having a south polarity as indicated at S. In other words, the permanent manget 66 has north and south polarities which appear alternately along the circumferential direction of the magnet 66. The control ring 52 carrying the permanent magnet 66 is preferably constructed of a non-magnetic material.

As schematically shown in FIG. 1, the electromagnetic drive unit 64 further comprises a stationary ferromagnetic ring 68 which is fixedly positioned in concentrically surrounding relationship to the permanent magnet 66 and which is bonded or otherwise securely fastened along the outer peripheral face thereof to the inner peripheral surface of the cylindrical side wall portion 40 of the housing structure 38. As is clearly seen in FIG. 6, the ferromagnetic ring 68 has an outer circular rim portion 70 and a predetermined number of limb portions 72 which radially inwardly project from the rim portion 70 and which are substantially regularly spaced apart from one another in circumferential direction of the ring 68. The radial limb portions 72 respectively terminate in enlarged end portions 74 each of which laterally projects substantially perpendicularly from both sides of each limb portion 72. The enlarged end portions 74 are also substantially regularly spaced apart from one another in a circumferential direction of the ring 68 and have respective end faces located along a circle having a center on the axis of rotation of the permanent magnet 66, viz., on the principal axis of the second lens system 22. The limb portions 72 are provided in a number which is a multiple of three and, thus, comprise a plurality of groups each consisting of three limb portions, the number of such groups being preferably equal to the number of the locally polarized curved portions of the permanent magnet 66. The permanent magnet 66 is herein assumed to have four locally polarized portions as above described, the ferromagnetic ring 68 is shown having four groups of limb portions 72 which thus total twelve in number.

Two coils 76 and 76' are carried on each group of limb portions 72 in such a manner that one coil 76 is wound on one pair of neighboring limb portions and the other coil 76' is wound on the other pair of neighboring limb portions so that the two coils 76 and 76' are jointly wound on the intermediate limb portion of each group. The coils 76 and 76' on the limb portions 72 of each group are wound in the opposite directions to the coils 76 and 76' on the limb portions 72 of the group next to the former so that the limb portions 72 and accordingly the adjacent enlarged end portions 74 in every group are magnetized to a polarity opposite to the polarity to which the limb portions 72 and accordingly the enlarged end portions 74 in each of the groups next to the former when the coils 76 and 76' are all energized, as indicated by N and S in FIG. 6. The two coils 76 and 76' for each group of limb portions 72 are, furthermore, assumed to have an equal number of turns so that the intermediate one of the limb portions 72 in each group is magnetized to an intensity which is approximately twice as great as the intensity to which each of the remaining two of the limb portions 72 is magnetized.

The coils 76 and 76' on the ferromagnetic ring 68 are electrically connected to suitable photoelectric transducer (not shown) such as a photoconductive cell or the signal plate of a vidicon. Such a transducer is located posterior to the second lens system 22 so that the coils 76 are energized with an analog electric signal which continuously varies with the amount of light which is passed through the lens systems and the aperture 50 formed by the diaphragm blades 46. When the coils 76 and 76' are thus energized, magnetic fields are produced in the individual enlarged end portions 74 of the ferromagnetic ring 68 so that the permanent magnet 66 surrounded by the enlarged end portions 74 is propelled to turn in either direction about its axis of rotation by interaction between the magnetic field constantly established by the permanent 66 and the magnetic field produced by the coils 76 and 76' which cut across the magnetic field established by the permanent magnet 66. The rotational motion of the permanent magnet 66 is carried through the control ring 52 and the driving pins 58 thereon to the individual diaphragm blades 46, which are accordingly driven to turn about the respective pivotal pins 48 thereof in either direction to enlarge or reduce the variable aperture 50 which are formed by the blades, depending upon the magnitude of the analog electric signal supplied to the coils 76 and 76'.

Figure 3:
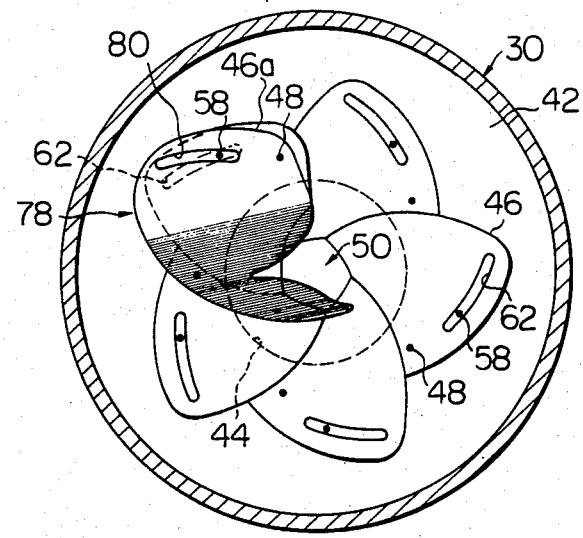
Figure 4:
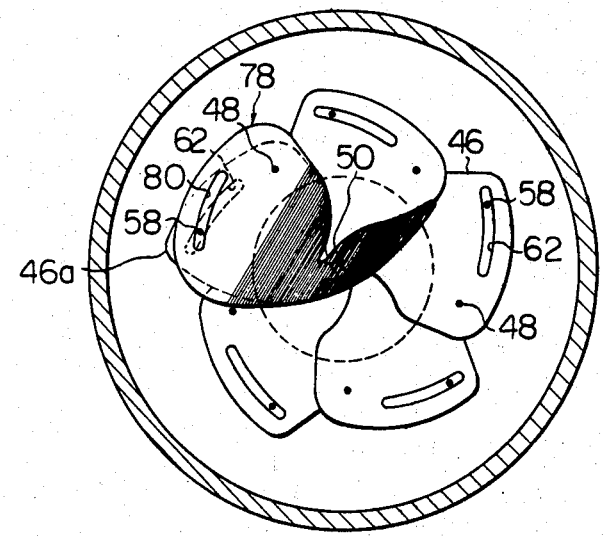

Referring again to FIGS. 2 to 5, the automatic diaphragm assembly embodying the present invention further comprises a neutral-density filter element 78 which is movably superposed on one of the diaphragm blades 46 and which is rotatable about the pivotal pin 48 supporting the particular diaphragm blade which is specifically designated by 46a in FIGS. 2 to 5. The neutral-density filter element 78 is assumed to consist of an opaque base portion 78a and a filter portion 78b which is indicated by the hatched area in each of FIGS. 2 to 5. The neutral-density filter element 78 has formed in its opaque filter portion 78a a curved slot 80 which is configured in such a manner as to have one end located closest to the pivotal pin 48 supporting the diaphragm blade 46a and to the center axis of the opening 44 in the flange 42 of the support structure 30 and to curvilinearly extend away from the particular pivotal pin 48 and the center axis of the opening 44 toward the other end of the slot 80, similarly to the slot 62 in each of the diaphragm blades 46. The driving pin 58 projecting from the slot 62 in the diaphragm blade 46a is movably passed through the slot 80 in the filter element 78 which is accordingly rotatable with the diaphragm blade 46a about the pivotal pin 48 supporting the blade 46a. The slot 80 in the neutral-density filter element 78 is curved similarly but in a predetermined angular relationship to the curved slot 62 in the diaphragm blade 46a so that the neutral-density filter element 78 is capable of turning about the associated pivotal pin 48 at a higher velocity than the diaphragm blade 46a when the control ring 52 is driven to turn about the center axis of the opening 44 in the flange 42. As will be seen from FIG. 2, furthermore, the neutral-density filter element 78 is located in its entirety out of the variable aperture 50 between the diaphragm blades 46 when the diaphragm blades 46 are in angular positions having the aperture 50 enlarged to a maximum area. As the diaphragm blades 46 are turned about the pins 48 in directions to reduce the variable aperture 50 as illustrated in FIG. 3, the neutral-density filter element 78 is also turned about the pin 48 supporting the diaphragm blade 46a and partially intercepts the aperture 50 by a leading end portion thereof. When the diaphragm blades 46 thus moved reach angular positions having the variable aperture 50 reduced to a minimum area as shown in FIG. 4, the filter 78 is in an angular position completely intercepting the aperture 50 by the leading end portion thereof.

Figure 7:
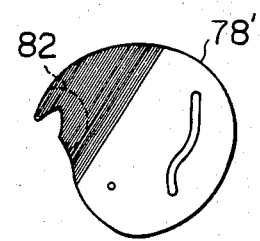
FIG. 7 is a plan view showing a modification of a neutral-density filter element included in the embodiment of FIG. 1.
Figure 8:
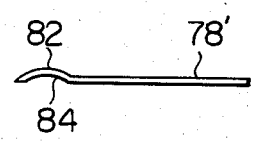
FIG. 8 is a side elevation of the neutral-density filter element of FIG. 7.

When a neutral-density filter element thus arranged is used in a television camera such as a vidicon, the filter element is located in front of the factplate of the camera. The light incident on the faceplate tends to be reflected from the faceplace and is thus re-directed toward the rear face of the filter if the filter element is in an angular position partially or totally intercepting the variable aperture 50. The light incident on the rear face of the filter element is further reflected therefrom and is for a second time incident on the faceplate of the television camera, tending to produce a ghost in the resultant television pictures. FIGS. 7 and 8 show a preferred example of a neutral-density filter element adapted to avoid such a problem. The neutral-density filter element, now designated by 78' has a leading end portion 82 having a convex front face and a concave rear face which is to confront the faceplate of a television camera into which the filer element 78' is assumed to be incorporated. The concave rear face of the leading end portion 82 is preferably formed with an anti-reflection coating 84.

Figure 9:
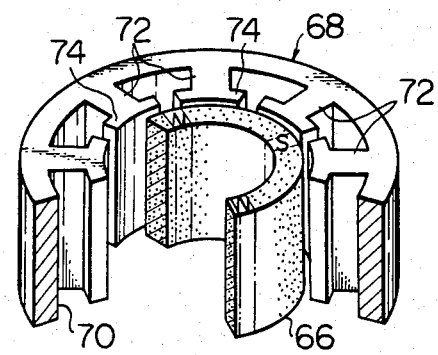
FIG. 9 is partially cut-away perspective view showing part of a modification of the electromagnetic drive unit of FIG. 6.
Figure 10:
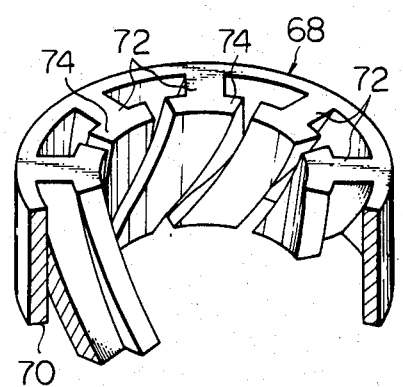
FIG. 10 is a partially cut-away perspective view showing a portion of a ferromagnetic ring forming part of another modification of the electromagnetic drive unit of FIG. 6.
Figure 11:
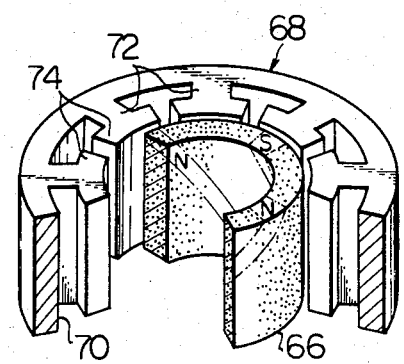
FIG. 11 is a view similar to FIG. 9 but shows still another modification of the electromagnetic drive unit of FIG. 6.

Reverting to the drive means for the diaphragm blades 46 and the neutral-density filter element 78 or 78' thus arranged, the ring-shaped permanent magnet 66 shown in FIGS. 1 and 6 is assumed to be polarized in such a manner that the locally magnetized pole portions N and S extend substantially in parallel with the center axis of the magnet 66 as shown in FIG. 9. When the permanent magnet 66 is thus configured, the limb portions 72 and accordingly the enlarged end portions 74 of the ferromagnetic ring 68 may also be formed to extend substantially in parallel with the center axis of the ring 68 as shown in FIG. 9 or may be formed to helically extend with respect to the center axis of the ring 68 so that neighboring two of the enlarged end portions 74 overlap each other in axial direction of the ring 68 as shown in FIG. 10. The ferromagnetic ring 68 being arranged as shown in FIG. 10, the enlarged end portions 74 of the ring 68 uniformly cut across the magnetic field of the permanent magnet 66 throughout the entire circumference of the ring 68 and, for this reason, the permanent magnet 66 serving as a rotor is permitted to immediately stop its rotational motion in whichsoever angular position the magnet 66 may happen to assume relative to the ferromagnetic ring 68 at the moment the coils 76 and 76' (FIG. 6) are de-energized. As an alternative, the ring-shaped permanent magnet 66 of the electromagnetic drive unit shown in FIGS. 1 and 6 may be polarized in such a manner that the locally magnetized pole portions N and S extend helically with respect to the center axis of the permanent magnet 66 as shown in FIG. 11. In this instance, the limb portions 72 and the enlarged end portions 74 of the ferromagnetic ring 68 extend substantially in parallel with the center axis of the ring 68.

Figure 12:
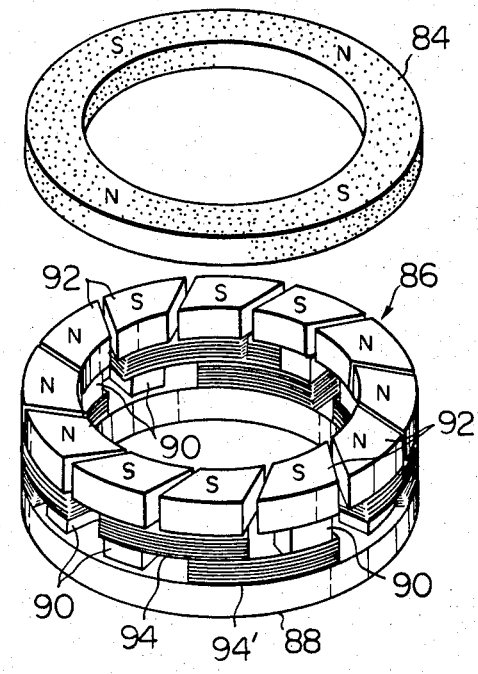
FIG. 12 is a perspective view showing still another modification of the electromagnetic drive unit of FIG. 6.

While the permanent magnet 66 and the ferromagnetic ring 68 of the electromagnetic drive unit 64 shown in FIGS. 1 and 6 are radially spaced apart from each other, they may be spaced apart from each other in axial direction as shown in FIG. 12. Referring to FIG. 12, an electromagnetic drive unit comprises a ring-shaped permanent magnet 84 and a stationary ferromagnetic ring 86 which is positioned axially in alignment with the magnet 84 and which is substantially equal in inside and outside diameters to the magnet 84. The ferromagnetic ring 86 has a circular rim portion 88 from which a plurality of limb portions 90 project substantially in parallel with the center axis of the ring 86 and are substantially regularly spaced apart from one another in circumferential direction of the ring 86. The axial limb portions 90 terminate in enlarged end portions 92 each of which projects in both directions from each limb portion 90 circumferentially of the ring 86. The individual enlarged end portions 92 are also regularly spaced apart from one another in circumferential direction of the ferromagnetic ring 86 and have axial end faces slightly spaced apart from one end face of the permanent magnet 84. Each of the enlarged end portions 92 has side end faces which are inclined from radial directions of the ring 86 so that the adjacent side faces of every neighboring two of the end portions 92 overlap each other in the circumferential direction of the ring 86. As in the electromagnetic drive unit illustrated in FIG. 6, the axial limb portions 90 of the ferromagnetic ring 86 shown in FIG. 12 are provided in a number which is a multiple of three and thus consist of a plurality of groups each consisting of three limb portions 90. Two coils 94 and 94' are carried on each group of limb portions 90 in such a manner that one coil 94 is wound on one pair of neighboring limb portions 90 and the other coil 94' is wound on the other pair of neighboring limb portions 90, similarly to the coils 76 and 76' in the electromagnetic drive unit of FIG. 6. The permanent magnet 84 is locally magnetized in such a manner as to have a first pair of diametrically opposed portions N each having a north polarity and a second pair of diametrically opposed portions S each having a south polarity. The permanent magnet 84 thus constructed is securely attached to a suitable modification of the control ring 52 of the arrangement illustrated in FIG. 1 while the ferromagnetic ring 86 is fixedly mounted on the housing structure 38 in a suitable manner so that the axial end faces of the individual end portions 92 thereof are slightly spaced apart from one end face of the permanent magnet 84 in axial direction.

While the permanent magnet 66 or 84 and the ferromagnetic ring 68 or 86 have been assumed to constitute a rotor and a stator, respectively, in the electromagnetic drive unit of each of FIGS. 6 and 12, they may be used as a stator and a rotor, respectively, if desired. For this purpose, the ferromagnetic ring 68 or 86 may be mounted in a suitable modification of the control ring 52 and the permanent magnet 66 or 84 fixedly mounted on the housing structure 38 in the arrangement of FIG. 1.

Although, furthermore, only one neutral-density filter element 78 is incorporated in the embodiment of the present invention as hereinbefore described, two or more neutral-density filter elements may be put to use if desired.

What is claimed is:

1. An automatic diaphragm assembly for an image pick-up device having lens systems, comprising a stationary support structure supporting said lens systems and including a flange formed with a substantially circular opening having a center axis therethrough, a plurality of diaphragm blades rotatable about respective axes disposed substantially symmetrically about said center axis, said diaphragm blades forming therebetween a variable aperture having maximum and minimum areas and a center axis substantially in line with the center axis of said opening, at least one neutral-density filter element rotatable about one of said respective axes of rotation of said diaphragm blades between an angular position located in its entirety out of said variable aperture when the diaphragm blades are in positions having the variable aperture enlarged to the maximum area and an angular position fully intercepting said variable aperture when the diaphragm blades are in positions having the variable aperture reduced to the minimum area, a ring-shaped permanent magnet having a center axis substantially in line with the center axis of said opening and having pole portions which have opposite polarities alternately disposed circumferentially of the magnet, a ferromagnetic ring positioned in substantially coaxial relationship to said permanent magnet and having a plurality of limb portions respectively terminating in end portions which are substantially regularly spaced apart from each other circumferentially of the ring and which have end faces located close to said permanent magnet, said limb portions consisting of a plurality of groups each consisting of three limb portions one of said permanent magnet and said ferromagnetic ring being fixedly held in position with respect to said support structure and the other thereof being rotatable about the center axis of said permanent magnet and in driving engagement with said diaphragm blades and said neutral-density filter element, and two coils carried on each of said groups, one of the two coils being wound on one pair of neighboring limb portions in each of said groups and the other of the two coils being wound on the other pair of neighboring limb portions in each of said groups, the coils on each of said groups being wound in the opposite directions to the coils on the neighboring groups.

2. An automatic diaphragm assembly as set forth in claim 1, in which said ferromagnetic ring is radially outwardly spaced apart from said permanent magnet and in which said limb portions project radially toward the outer peripheral surface of the permanent magnetic and have said end faces of said end portions located close to the outer peripheral surface of the magnet.

3. An automatic diaphragm assembly as set forth in claim 2, in which said ferromagnetic ring is fixedly held in position with respect to said support structure and said permanent magnet is rotatable about said center axis thereof substantially concentrically within said ferromagnetic ring.

4. An automatic diaphragm assembly as set forth in claim 2, in which said permanent magnet is fixedly held in position with respect to said support structure and said ferromagnetic ring is rotatable about said center axis of the permanent magnet substantially concentrically around the magnet.

5. An automatic diaphragm assembly as set forth in claim 1, in which said permanent magnet and said ferromagnetic ring are spaced apart from each other in a direction substantially parallel with the center axis of the permanent magnet and in which said limb portions project axially toward one end face of the permanent magnet and have said end faces of said end portions located close to said end face of the permanent magnet.

6. An automatic diaphragm assembly as set forth in claim 5, in which said ferromagnetic ring is fixedly held in position with respect to said support structure and said permanent magnet is rotatable about said center axis thereof.

7. An automatic diaphragm assembly as set forth in claim 5, in which said permanent magnet is fixedly held in position with respect to said support structure and said ferromagnetic ring is rotatable about said center axis of the permanent magnet.

8. An automatic diaphragm assembly as set forth in claim 1, in which said diaphragm blades and said neutral-density filter element are interposed between said lens systems.

9. An automatic diaphragm assembly as set forth in claim 1, in which said neutral-density filter element has a leading end portion movable through said variable aperture and having a front face on which the light from the outside is to be incident, said leading end portion having a convex front face portion and a convex rear face portion.

10. An automatic diaphragm assembly as set forth in claim 9, in which said rear face portion is formed with an anti-reflection coating.

11. An automatic diaphragm assembly as set forth in claim 1, in which said pole portions extend substantially in parallel with the center axis of said permanent magnet.

12. An automatic diaphragm assembly as set forth in claim 11, in which said end portions of said ferromagnetic ring extend substantially in parallel with the center axis of said permanent magnet.

13. An automatic diaphragm assembly as set forth in claim 11, in which said end portions of said ferromagnetic ring extend helically with respect to the center axis of said permanent magnet and in which neighboring two of said end portions partially overlap each other in the axial direction of the ring.

14. An automatic diaphragm assembly as set forth in claim 1, in which said pole portions extend helically with respect to the center axis of said permanent magnet.

15. An automatic diaphragm assembly as set forth in claim 14, in which said end portions of said ferromagnetic ring extend substantially in parallel with the center axis of said permanent magnet.

* * * * *